United States Patent
Garlow et al.

(10) Patent No.: US 9,124,169 B2
(45) Date of Patent: Sep. 1, 2015

(54) AUTOTRANSFORMER SYSTEM REDUCING TOTAL HARMONIC DISTORTION

(71) Applicant: Unico, Inc., Franksville, WI (US)

(72) Inventors: Mark E. Garlow, Kenosha, WI (US); William S. Hammel, Franksville, WI (US)

(73) Assignee: Unico, Inc., Franksville, WI (US)

( * ) Notice: Subject to any disclaimer, the term of this patent is extended or adjusted under 35 U.S.C. 154(b) by 282 days.

(21) Appl. No.: 13/868,693

(22) Filed: Apr. 23, 2013

(65) Prior Publication Data
US 2014/0265955 A1   Sep. 18, 2014

Related U.S. Application Data

(60) Provisional application No. 61/781,715, filed on Mar. 14, 2013.

(51) Int. Cl.
| | |
|---|---|
| *H02M 5/14* | (2006.01) |
| *H02M 1/12* | (2006.01) |
| *H01F 30/02* | (2006.01) |
| *H02M 7/08* | (2006.01) |
| *H02P 29/00* | (2006.01) |
| *H02M 1/14* | (2006.01) |

(52) U.S. Cl.
CPC .............. *H02M 1/12* (2013.01); *H01F 30/02* (2013.01); *H02M 7/08* (2013.01); *H02P 29/0038* (2013.01); *H02M 1/14* (2013.01)

(58) Field of Classification Search
CPC .................................. H02M 5/14; H02M 7/08
USPC ................................................ 363/3, 10, 154
See application file for complete search history.

(56) References Cited

U.S. PATENT DOCUMENTS

| | | | |
|---|---|---|---|
| 4,779,181 A | * | 10/1988 | Traver et al. ................... 363/154 |
| 5,124,904 A | * | 6/1992 | Paice ................................. 363/3 |
| 6,101,113 A | | 8/2000 | Paice |

(Continued)

FOREIGN PATENT DOCUMENTS

| | | |
|---|---|---|
| JP | 2003304680 | 10/2003 |
| KR | 1020050007860 A | 7/2003 |

OTHER PUBLICATIONS

Rasmussen, Jim, "Ask the Engineer", GE ESL Magazine, Spring 2005.

(Continued)

*Primary Examiner* — Jeffrey Sterrett
(74) *Attorney, Agent, or Firm* — Reinhart Boerner Van Deuren P.C.

(57) ABSTRACT

There is disclosed an apparatus and method to reduce total harmonic distortion input into a 24-pulse autotransformer system and the autotransformer system itself. The 24-pulse autotransformer system is configured to receive an input of a first voltage and produce an output voltage of a second voltage. The system includes a pair of autotransformers coupled to an AC power source. One winding of each phase of the first autotransformer has a turn ratio to effect a decrease in the voltage across said winding over a symmetric voltage value and a second winding of each phase of the first autotransformer has a turn ratio to effect a decrease in the voltage across said winding over a symmetric voltage value, thereby reducing total harmonic distortion (THD) in the input current to the system without a zero sequence blocking transformer.

18 Claims, 9 Drawing Sheets

(56) References Cited

U.S. PATENT DOCUMENTS

| | | | |
|---|---|---|---|
| 6,198,647 B1 * | 3/2001 | Zhou et al. | 363/154 |
| 6,525,951 B1 * | 2/2003 | Paice | 363/154 |
| 7,049,921 B2 | 5/2006 | Owen | |
| 7,277,302 B2 * | 10/2007 | Gazel et al. | 363/5 |
| 7,990,242 B2 | 8/2011 | Owen | |
| 8,159,841 B2 | 4/2012 | Owen | |
| 8,243,481 B2 * | 8/2012 | Wei et al. | 363/69 |
| 8,315,071 B2 | 11/2012 | Ganev et al. | |
| 8,982,595 B2 * | 3/2015 | Abdollahi | 363/154 |
| 2008/0278967 A1 * | 11/2008 | Furmanczyk | 363/3 |
| 2011/0051480 A1 * | 3/2011 | Blanchery | 363/154 |
| 2014/0265955 A1 * | 9/2014 | Garlow et al. | 318/400.3 |

OTHER PUBLICATIONS

TechTopics No. 50, Siemens Energy, Inc., Published by and copyright © 2010, Siemens AG.

* cited by examiner

AUTOTRANSFORMER SYSTEM REDUCING TOTAL HARMONIC DISTORTION

CROSS-REFERENCE TO RELATED PATENT APPLICATIONS

This patent application is a non-provisional application which claims the benefit to U.S. Provisional Patent Application No. 61/781,715, filed Mar. 14, 2013, entitled "Autotransformer System Reducing Total Harmonic Distortion," which patent application is assigned to the assignee of the present invention, and which patent application is hereby incorporated herein by this reference in its entirety.

BACKGROUND OF THE INVENTION

Field of the Invention

This disclosure relates to an autotransformer system, more particularly to a system of multiple pulse rectifiers coupled to a pair of reversed phase sequence configured autotransformers for reducing total harmonic input currents to the system.

Multi-pulse rectifier systems, when connected to an output of an autotransformer, tend to produce a current that includes harmonic currents that flow between the transformer outputs. One such harmonic current is the third harmonic, i.e. 180 $H_z$. Reducing the total harmonic distortion input (THDI) to the system is a goal addressed by circuit designers, particularly for motor control systems.

It is known to reduce THDI in a system by using zero sequence blocking transformers on the output side of the transformer and before the input of the rectifier. However, use of zero sequence blocking transformer is an additional expense for the system, increases heat dissipation costs, and are bulky. Such blocking transformers are difficult to utilize because of costs and space requirements.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

There is provided a method to reduce total harmonic distortion input in a 24-pulse autotransformer system. The 24-pulse autotransformer system is configured to receive an input of a first voltage and produce an output voltage of a second voltage. The method includes coupling a first three-phase autotransformer to an AC power source. The first autotransformer includes a particular winding arrangement including three input terminals and six output terminals.

A first pair of rectifier units are coupled to the output terminals of the first three-phase autotransformer. Each rectifier has three input terminals and a plus and minus output terminal.

The method includes a second three-phase autotransformer coupled to the AC power source with the second autotransformer having three input terminals and six output terminals. The second three-phase autotransformer input terminals are coupled to the first three-phase autotransformer input terminals in a reverse phase sequence configuration.

A second pair of rectifier units are coupled to the output terminals of the second three-phase transformer.

The method includes, when the output voltage is less than the input voltage, adjusting the turn ratio of two windings of each phase of each of the first and second three-phase autotransformers. Such adjustment to the turn ratios of the two windings effects a decrease in the voltages across said adjusted windings from the symmetric voltage values resulting in reduced input total harmonic distortion without use of a zero sequence blocking transformer. The method includes coupling each of the positive output terminals of each of the rectifier units to a first input terminal of an electrical load and coupling the negative output terminals of each of the rectifier units to a second input terminal of the electrical load.

In one embodiment, the electrical load includes an inverter and an AC motor. In some embodiments, the autotransformers in the 24-pulse autotransformer system can be configured as a step-down transformer wherein the second voltage is less than the first voltage or it can be configured as a step-up autotransformer wherein the second voltage is greater than the first voltage. In either of the configurations, the total harmonic distortion of the input current to the system is reduced to comply with applicable standards.

There is also provided an autotransformer system configured to reduce total harmonic distortion input to the system. The system is configured to receive an input of a first voltage and produce an output voltage of a second voltage. The system includes a first three-phase autotransformer coupled to an AC power source, with the first autotransformer having three input terminals and six output terminals. One winding of each phase of the first three-phase autotransformer has a turn ratio divided by 1.2 to effect a sixteen and two/thirds percent decrease in the voltage across said winding over a symmetric voltage value and a second winding of each phase of the first three-phase autotransformer has a turn ratio divided by 1.3 to effect slightly more than a twenty three percent decrease in the voltage across said winding over a symmetric voltage value, thereby reducing total harmonic distortion (THD) in the input current to the system without a zero sequence blocking transformer.

A first pair of rectifier units are coupled to the output terminals of the first three-phase autotransformer. Each rectifier has three input terminals and a plus and minus output terminal.

A second three-phase autotransformer is coupled to the AC power source, with the second autotransformer having three input terminals and six output terminals. The second three-phase autotransformer input terminals are coupled to the first three-phase autotransformer input terminals in a reverse phase sequence configuration. One winding of each phase of the second three-phase autotransformer has a turn ratio divided by 1.2 to effect a sixteen and two/thirds percent decrease in the voltage across said winding from a symmetric voltage value and a second winding of each phase of the first three-phase autotransformer has a turn ratio divided by 1.3 to effect slightly more than a twenty three percent decrease in the voltage across said winding from a symmetric voltage value thereby reducing the total harmonic distortion (THD) in the input current without a zero sequence blocking transformer.

A second pair of rectifier units are coupled to the output terminals of the second three-phase autotransformer. Each rectifier unit has three input terminals and a plus and minus output terminal. Each of the positive output terminals of each of the first and second rectifier units are coupled to a first input terminal of an electrical load and each of the negative output terminals of each of the rectifier units are coupled to a second input terminals of an electrical load.

In another embodiment, the system includes an inverter with the inverter having a plus and a minus input terminal and three output terminals. The inverter is coupled to the output of the first and second pairs of rectifiers and the electrical load. In another embodiment, the system is coupled to an electrical load that is an AC motor.

The autotransformer system can be configured as a step-down transformer system wherein the second voltage is less than the first voltage. The autotransformer system can alternatively be configured as a step-up transformer system wherein the second voltage is greater than the first voltage. In either of the two configurations for the autotransformer system, the total harmonic distortion of input current to the system is reduced in accord with this disclosure.

The apparatus of the present disclosure is of a construction which is both durable and long lasting, and which will require little or no maintenance to be provided by the user throughout its operating lifetime. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

As is generally known, autotransformers are often used to step-up or step-down voltages in a given application. In a circuit to control an electric motor, the quality of the power from a source to the motor is critical to the circuit design. In a normal alternating current power system, the voltage varies sinusoidally, typically between 50-60 hertz, if a non-linear load, such as a rectifier is connected to the system, the current draw is usually not sinusoidal. A major effect that occurs in the latter is that the power system harmonics increases the current in the system particularly a third harmonic zero sequence current that flows between output terminals of the autotransformers and results in increased fifth and seventh harmonic currents in the inputs of the autotransformers.

Figure 11:
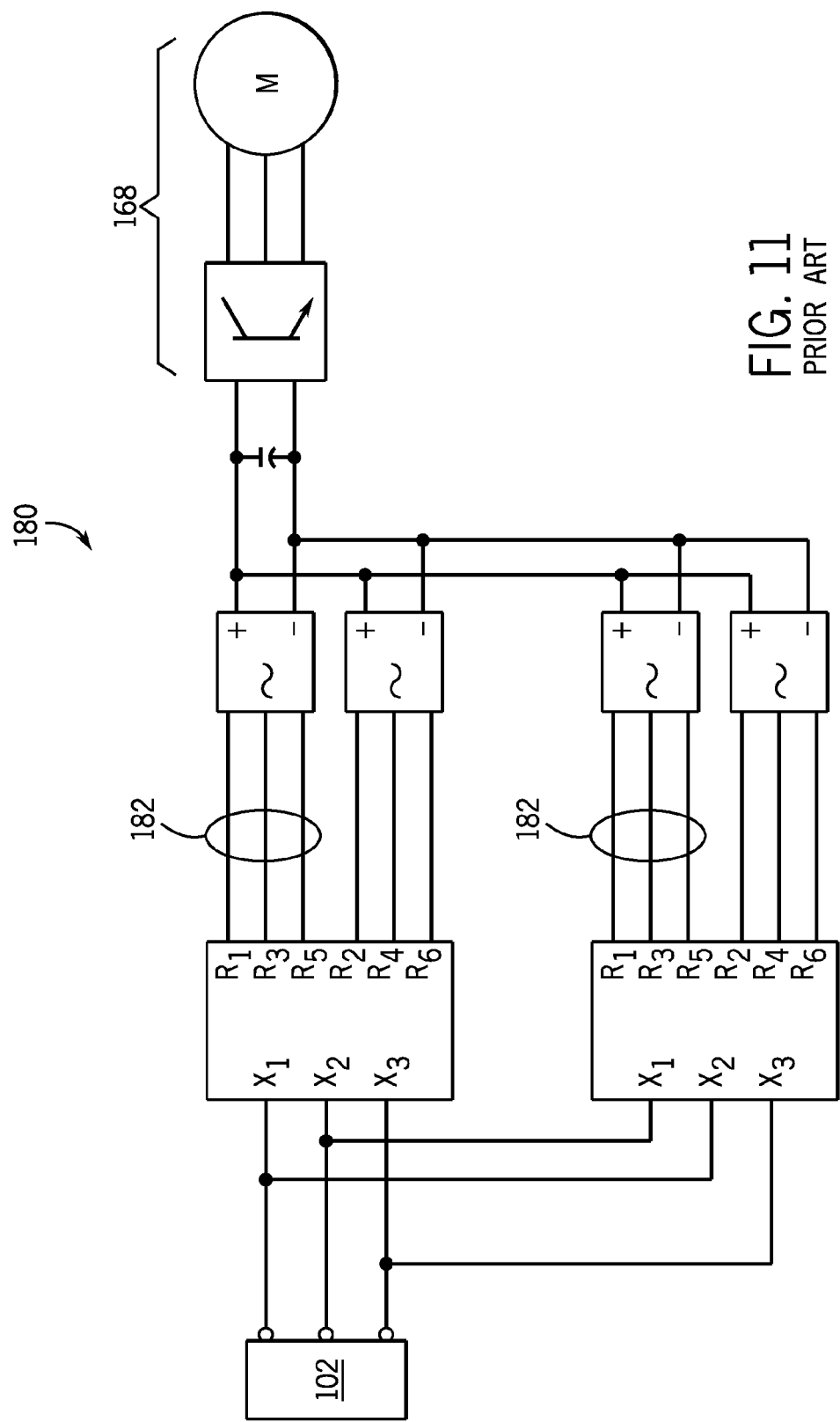
FIG. 11 is a prior art schematic illustration of an exemplary embodiment of an autotransformer system having five windings per phase and including zero sequence blocking transformers.

A system in the prior art, as illustrated in FIG. 11, couples to an AC power source 102 to an electric load 168. The circuit utilizes zero sequence blocking transformers 182 on the output side of the transformers in the system to minimize the zero sequence of current flowing in the system. The circuit illustrated in FIG. 11 is a 24-pulse autotransformer system with a zero sequence blocking transformer 182 coupled to each transformer. Such arrangement increased the cost of the system and higher ongoing maintenance.

The use of the zero sequence blocking transformer to minimize the third harmonic in the system, is to conform to applicable standards, such as IEEE-519, which require that the input current total harmonic distortion (THD) be less than a specified value.

Referring now to the FIGS. 1-9, FIG. 1 discloses a 24-pulse autotransformer system 100 which minimizes the third harmonic zero sequence current flowing between the outputs of the two transformers 104, 132 through the rectifier bridges 124, 152.

The disclosure, describes a method to reduce total harmonic distortion input into a 24-pulse autotransformer system and the autotransformer system 100 itself. The 24-pulse autotransformer system is configured to receive an input of a first voltage and produce an output voltage of a second voltage.

Figure 1:
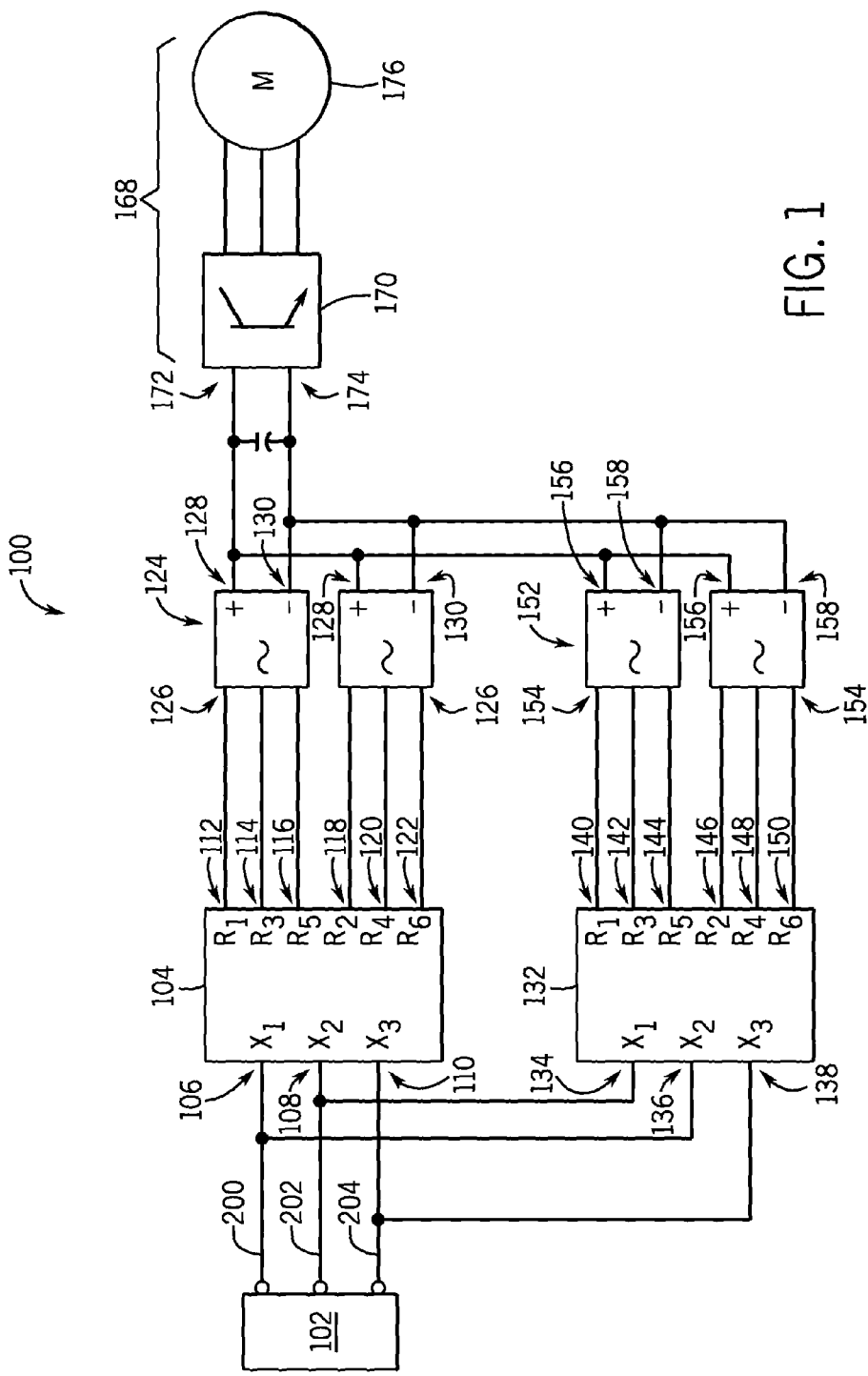
FIG. 1 is a schematic illustration of an exemplary embodiment of a 24-pulse autotransformer system coupled to a single load including two three-phase autotransformers coupled together, at the input in a reverse phase sequence configuration, to reduce input total harmonic distortion without a zero sequence blocking transformer.

FIG. 1 illustrates an overall schematic of a 24-pulse autotransformer system configured to reduce total harmonic distortion input to the system.

An AC power source 102, providing three phases of input current and voltage 200, 202 and 204, is coupled to a first autotransformer 104 and a second autotransformer 132. The second three-phase autotransformer 132 is coupled to the first three-phase autotransformer 104 input terminals 106, 108, 110 in a reverse phase sequence configuration. Such arrangement affects a phase sequence change as determined by the user of the system 100.

Figure 2:
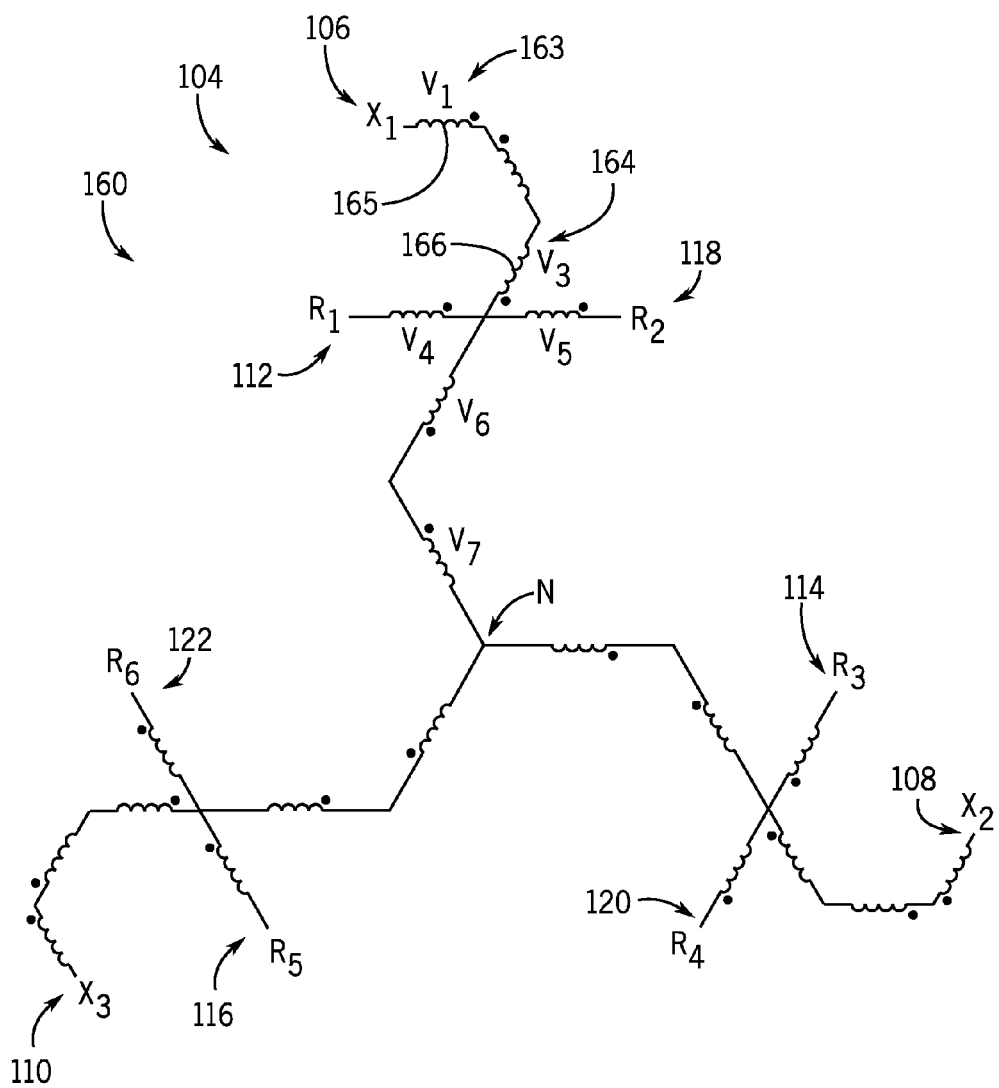
FIG. 2 is a schematic illustration of transformer windings in one of the autotransformers illustrated in FIG. 1, configured as a step-down transformer.
Figure 3:
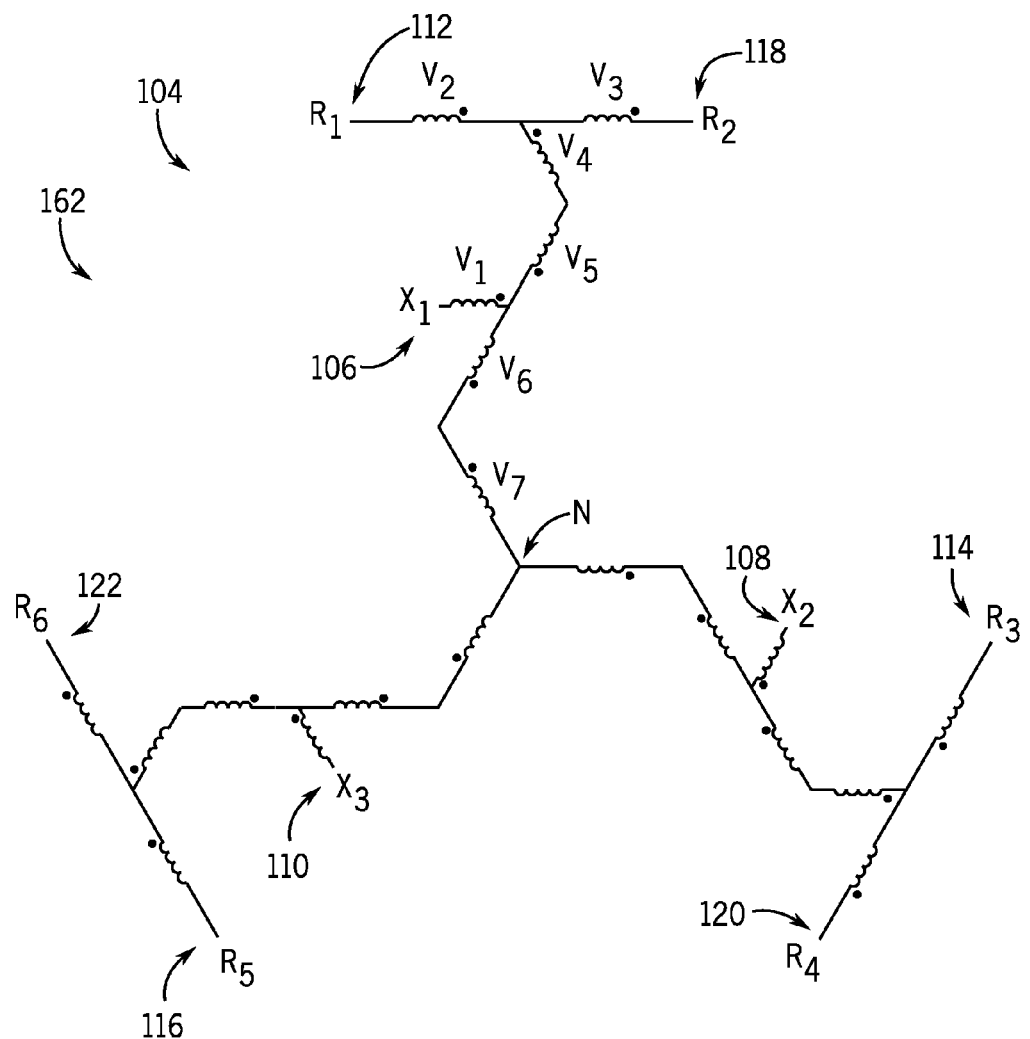
FIG. 3 is a schematic illustration of transformer windings in one of the autotransformers illustrated in FIG. 1, configured as a step-up transformer.

The output terminals 112-122 of the first autotransformer 104 are coupled to a first pair of rectifier units 124. Likewise, the output terminals 140-150 of the second autotransformer 132 are coupled to a second pair of rectifier units 152. The output terminals 128, 130 of the first pair of rectifier units 124 and the output terminals 156, 158 of the second pair of rectifier units 152 are coupled to an inverter 170 of the electrical load 168 which in turn is coupled to the electric motor 176. The autotransformers 104, 132 of the system 100 can be configured as either a step down transformer as illustrated in FIG. 2 or a step up transformer as illustrated in FIG. 3. The winding schematics illustrated in FIGS. 2 and 3 are for each of the two autotransformers 104, 132 illustrated in FIG. 1. In each of the configurations, both autotransformers would be wired as either step-up or step-down as determined by the user wherein the one output for each phase of the autotransformer would be shifted by −7.5 degrees relative to the input for that phase and the other output for that phase of the autotransformer would be shifted by +22.5 degrees relative to the input for that phase.

The system is tuned to minimize the third harmonic flowing between the two sets of rectifier units 124, 152 by adjusting the turn ratios 165, 166 of two windings 163, 164 of each phase of each of the first and second three-phase autotransformers 104, 132. The turn ratio 166 is divided by 1.3 to effect slightly more than a twenty three percent decrease in the voltage across said winding from a symmetric voltage value and the turn ratio 165 is divided by 1.2 to effect a sixteen and two/thirds percent decrease in the voltage across said winding from a symmetric voltage value resulting in a reduced input THD. The goal is a reduction in total harmonic distortion input current to the system.

Figure 4:
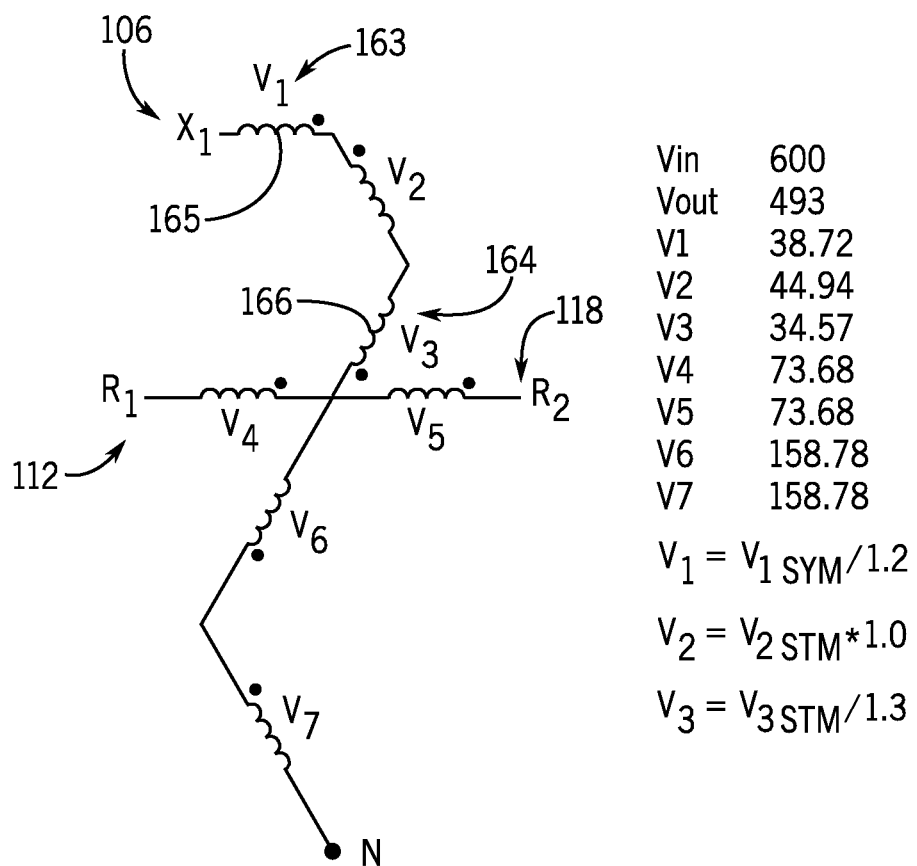
FIG. 4 is a schematic illustration of transformer windings in one phase of the transformer illustrated in FIG. 2 from terminal $X_1$, to the neutral including two windings configured to effect a decrease in voltage across such windings resulting in reduced input THD.

FIG. 4 illustrates an exemplary embodiment of one phase of the autotransformer illustrated in FIG. 2. That phase of the first autotransformer 104 is configured as a zig-zag transformer having seven windings per phase with the $X_1$ input terminal 106 extending to the neutral end N with the output terminals are $R_1$, 112 and $R_2$, 118 configured such that the input phase-to-phase voltage of 600 volts results in an output phase-to-phase voltage of 492 volts. A turn ratio 166 of one winding 164 of each 164 is designated $V_3$ as being 33.65 volts. A turn ratio 165 of a second winding of each phase 163 is designated $V_1$ as being 37.68 volts. The table in FIG. 4 illustrates the voltages for each of the identified windings. It should be understood that all three phases of the three-phase first autotransformer 104 would have identical windings and voltages within the industry standards.

As mentioned above, FIG. 3 illustrates the first autotransformer 104 configured as a step-up transformer 162, also referred to as a boost transformer.

As mentioned above, FIG. 2 illustrates the first autotransformer 104 configured as a step-down transformer 160, also referred to as a buck transformer.

Figure 5:
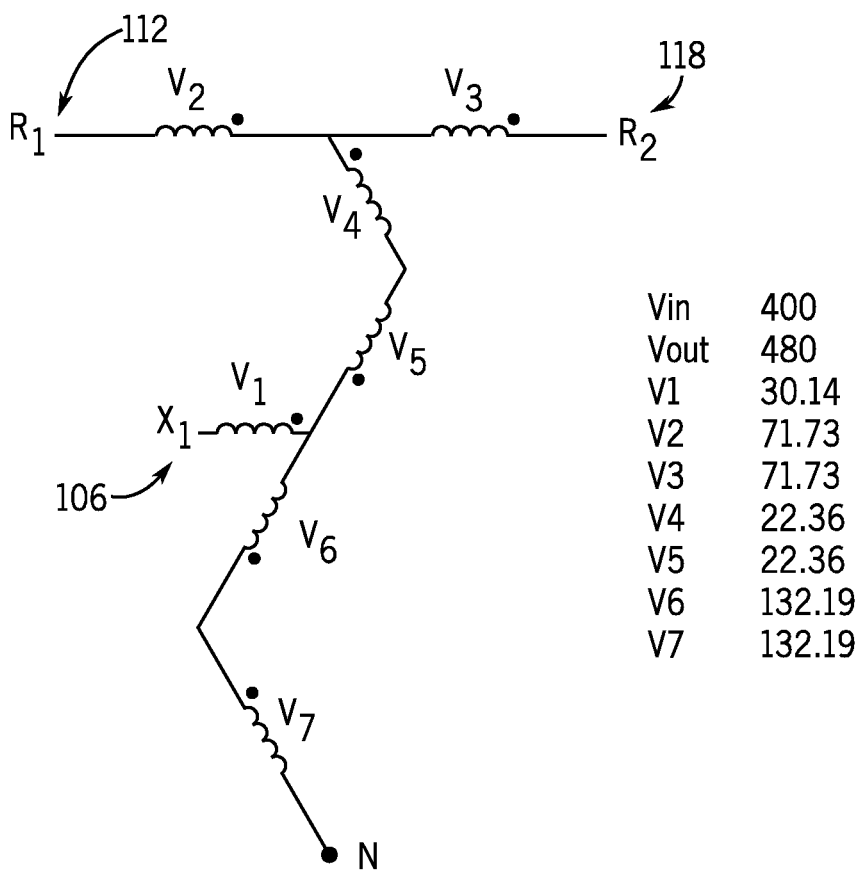
FIG. 5 is a schematic illustration of transformer windings in one phase of the transformer illustrated in FIG. 3 from the output terminals $R_1$-$R_2$ to the neutral resulting in reduced input THD.

FIG. 5 illustrates one phase of the autotransformer illustrated in FIG. 3 with the output terminals $R_1$-$R_2$ to the neutral N resulting in a reduced input THD. $R_1$, 112 and $R_2$, 118 result in total output phase-to-phase voltage of 480 with a total input phase-to-phase voltage of 400. The table in FIG. 5 presents the voltages on each of the windings of that phase of the three-phase autotransformer 104. Again it should be understood that each of the phases of the autotransformers 104, 132 would be wound similarly resulting in similar voltages as illustrated in FIG. 5.

The Table 1 below sets out a voltage for an exemplary embodiment of the step-down transformer configuration 160 illustrated in FIG. 2. The Table 2 below sets out a voltage for an exemplary embodiment of a step-up transformer configuration 162 illustrated in FIG. 3. In each case the specific individual winding voltages $V_1$-$V_7$ as well as the per unit ratio (PU) is set out. The per unit (PU) ratio is determined by dividing the individual winding voltage by the input phase-to-phase voltage.

TABLE 1

| Buck | VRMS | PU |
|---|---|---|
| Vin | 600 | 1.000 |
| Vout | 492 | 0.822 |
| V 1 | 37.68 | 0.063 |
| V 2 | 43.74 | 0.073 |
| V 3 | 33.65 | 0.056 |
| V 4 | 71.72 | 0.120 |
| V 5 | 71.72 | 0.120 |
| V 6 | 154.55 | 0.258 |
| V 7 | 154.55 | 0.258 |

TABLE 2

| Boost | VRMS | PU |
|---|---|---|
| Vin | 400 | 1.000 |
| Vout | 480 | 1.200 |
| V 1 | 30.14 | 0.075 |
| V 2 | 71.73 | 0.179 |
| V 3 | 71.73 | 0.179 |
| V 4 | 22.36 | 0.056 |
| V 5 | 22.36 | 0.056 |
| V 6 | 132.19 | 0.331 |
| V 7 | 132.19 | 0.331 |

Figure 6:
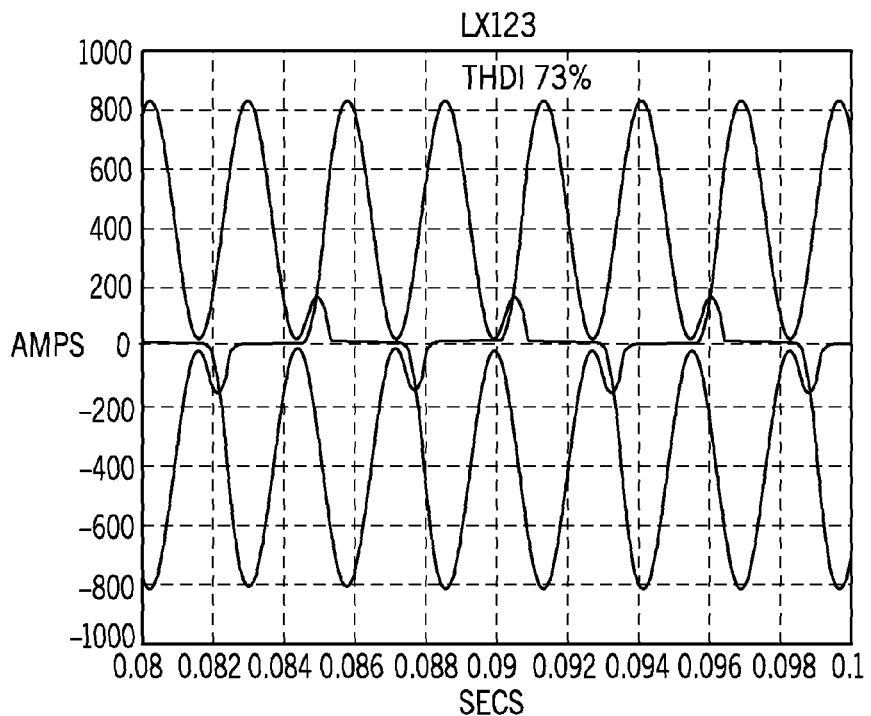
FIG. 6 is an instrument trace of three current inputs to the prior art 24-pulse autotransformer system.

FIG. 6 illustrates the individual phase input currents 200, 202 and 204 to the system 100 from the AC power source 102 at the input terminals $X_1$, $X_2$, and $X_3$ of the two autotransformers 104, 132 without the adjusted turn ratio and the specific winding arrangement of each phase of the first and second three-phase autotransformers 104, 132. The chart in FIG. 6 illustrates the total harmonic distortion of the input current, without the turn ratio adjustment and specific winding arrangement described above, to be 73.0 percent.

Figure 7:
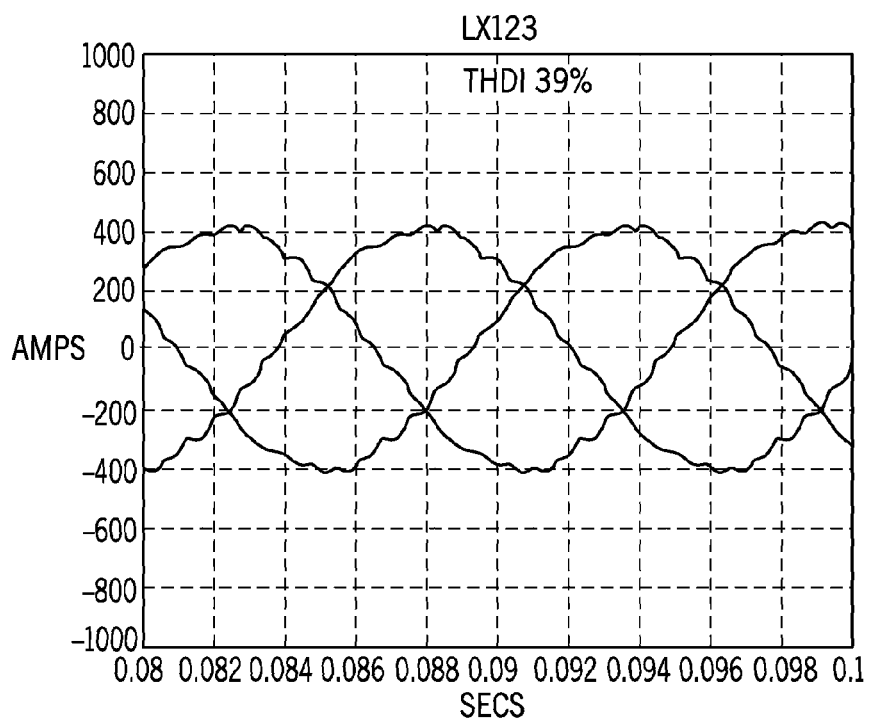
FIG. 7 is a is an instrument trace of three current inputs to the 24-pulse autotransformer system illustrated in FIGS. 1 and 2.

FIG. 7 illustrates the individual phase input currents 200, 202 and 204 to the system 100 from the AC power source 102 at the input terminals $X_1$, $X_2$, and $X_3$ of the two autotransformers 104, 132 with the turn ratio 165 and 166 adjustment of the two windings 163 and 164 for both the first and second three-phase autotransformers 104, 132 as described above over a symmetric voltage value resulting in the winding voltages shown in FIG. 4 and a reduced input THD, without a zero sequence blocking transformer, of 3.9 percent.

Figure 8:
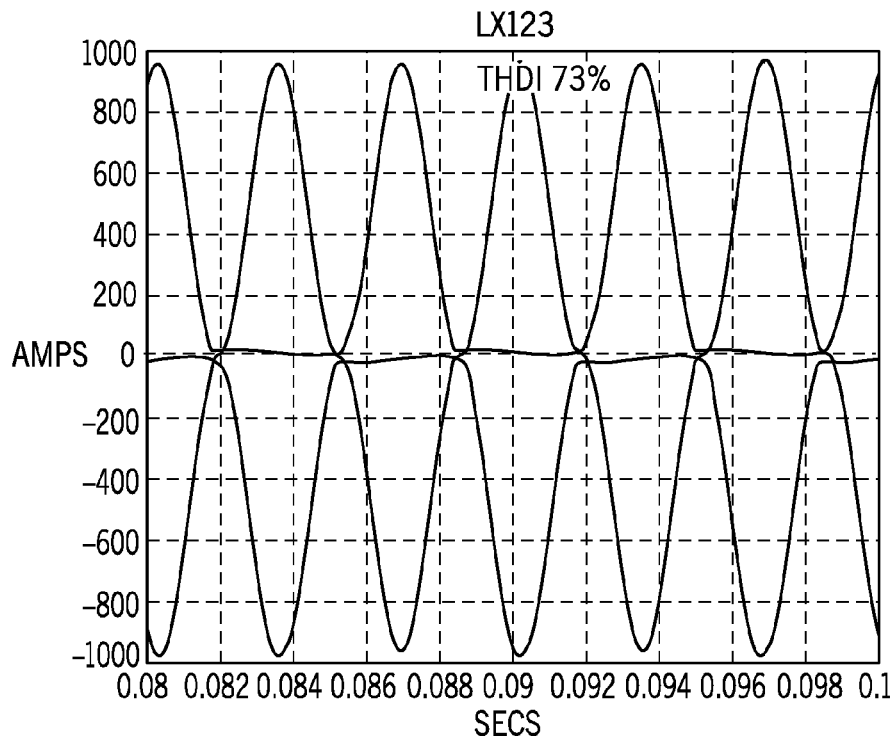
FIG. 8 is an instrument trace of three current inputs to the prior art 24-pulse autotransformer system.
Figure 9:
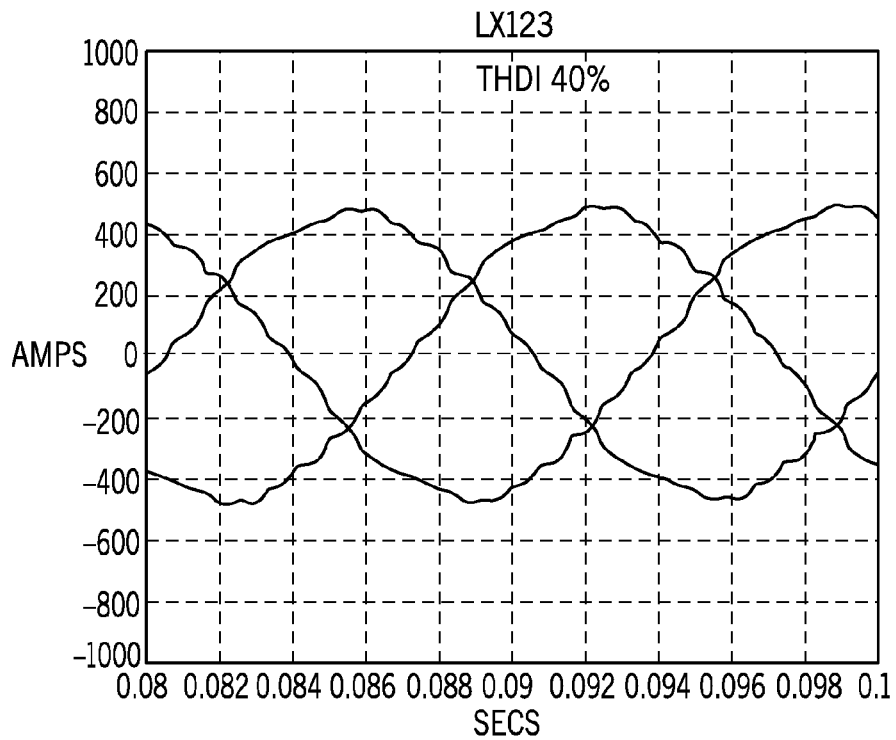
FIG. 9 is an instrument trace of three current inputs to the 24-pulse autotransformer system illustrated in FIGS. 1 and 3.

Likewise, FIG. 8 illustrates the input currents 200, 202 and 204 to the system 100 from the AC power source 102 at the input terminals $X_1$, $X_2$, and $X_3$ of the two autotransformers 104, 132 without any turn ratio adjustment in the autotransformer configured as a step-up transformer as illustrated in FIG. 3. FIG. 9 illustrates the input currents 200, 202 and 204 to the system 100 from the AC power source 102 at the input terminals $X_1$, $X_2$, and $X_3$ of the two autotransformers 104, 132 and illustrating a total harmonic distortion of four percent.

Figure 10:
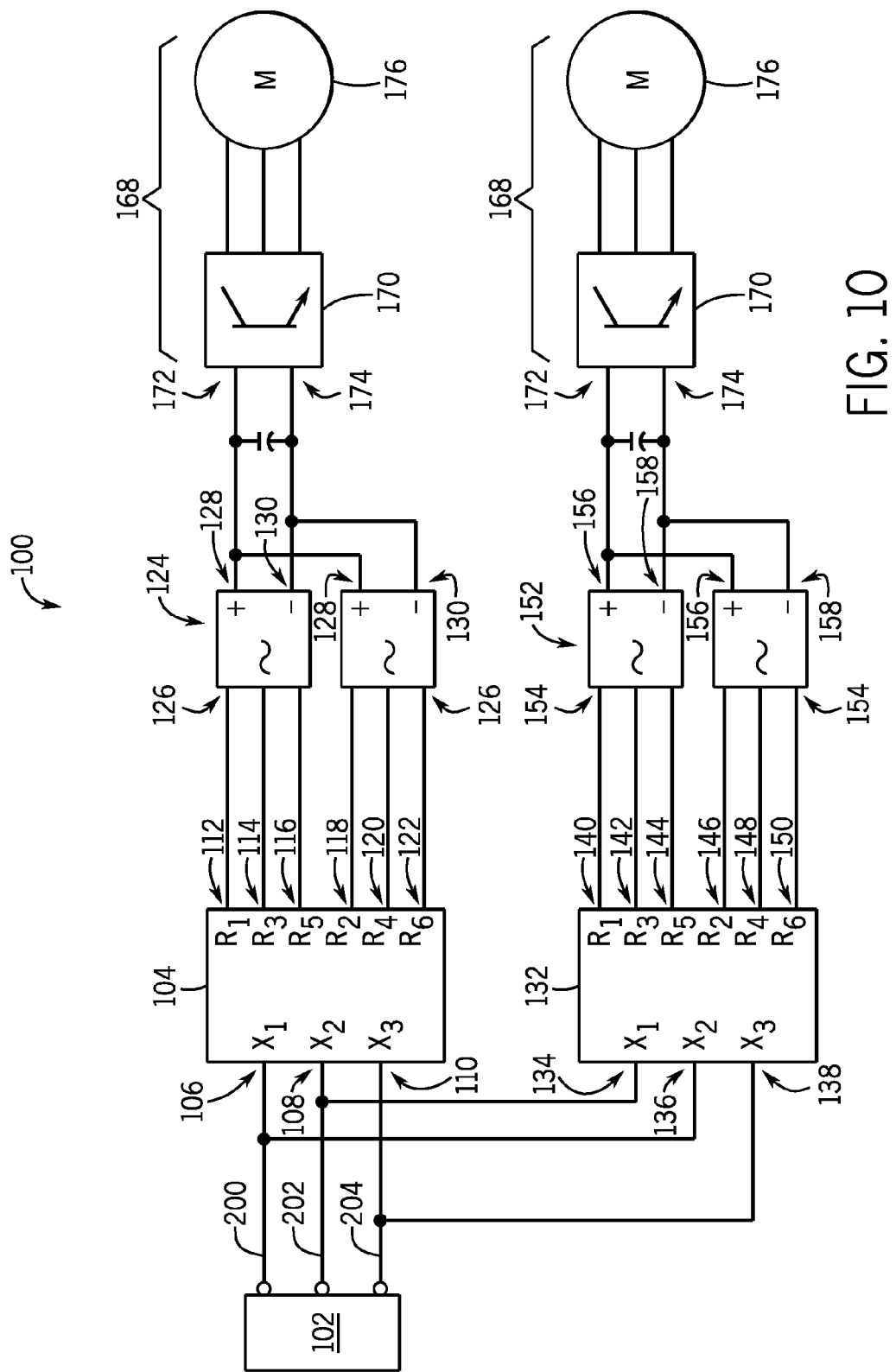
FIG. 10 is a schematic illustration of an exemplary embodiment of a 24-pulse autotransformer system coupled to two separate loads including two three-phase autotransformers coupled together, at the input in a reverse phase sequence configuration, to reduce input total harmonic distortion without a zero sequence blocking transformer.

As generally described with respect to FIG. 1, each of the positive output terminals 128, 156 of each of the rectifier units 124, 152 are coupled to a first input terminal 172 of the electrical load 168. Further, the negative output terminals 130, 158 of each of the rectifier units 124, 152 are coupled to the second input terminal 174 of the electrical load 168. In another embodiment, as illustrated in FIG. 10, the electrical load is configured as two separate circuits. One load circuit is coupled to the first pair of rectifier units and the other load circuit is coupled to the second pair of rectifier units. In one embodiment, the electrical load comprises an inverter 170 and an AC motor 176.

In the step-down transformer configuration 160 the second voltage is less than the first voltage. As illustrated in the tables above the second voltage is 493 volts and the first voltage is 600 volts. When the system 100 is configured as a step-up transformer system 162, the second voltage is greater than the first voltage. As illustrated in the table above, the first voltage is 400 volts and the second voltage is 480 volts. It should be noted that the input and output voltages described herein are root-mean-square phase to phase voltages. This disclosure describes a system 100, either in the step-down configuration 160 or the step-up configuration 162 illustrated in the figures, providing a reduced total harmonic distortion of input current to the system.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present mechanism has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the mechanism as described herein may be made, none of which depart from the spirit or scope of the present disclosure. The particular embodiments and applications were chosen and described to provide the best illustration of the principles of the mechanism and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A method to reduce total harmonic distortion input in a 24-pulse autotransformer system configured to receive an input of a first voltage and produce an output voltage of a second voltage, wherein the second voltage is less than the first voltage, the method comprising:
   coupling a first three-phase autotransformer to an AC power source, the first autotransformer comprising twenty-one windings having three input terminals and six output terminals;
   coupling a first pair of rectifier units to the output terminals of the first three-phase autotransformer, each rectifier having three input terminals and a positive and a negative output terminal;
   coupling a second three-phase autotransformer to the AC power source, the second autotransformer having three input terminals and six output terminals with the second three-phase autotransformer input terminals coupled to the first three-phase autotransformer input terminals in a reversed phase sequence configuration;
   coupling a second pair of rectifier units to the output terminals of the second three-phase autotransformer;
   adjusting turn ratios of two windings of each phase of the first and second three-phase autotransformers to effect a decrease in the voltage across said two windings leg from a symmetric voltage value resulting in a reduced input THD without a zero sequence blocking transformer; and
   coupling each of the positive and negative output terminals of each of the rectifier units to an electrical load.

2. The method of claim 1, wherein the electrical load is configured as two separate circuits with one of the separate circuits coupled to the positive and negative output terminals of the first pair of rectifier units and the other separate circuit coupled to the positive and negative output terminals of the second pair of rectifier units.

3. The method of claim 1, wherein the electrical load comprises an inverter and an AC motor.

4. The method of claim 1, wherein the total harmonic distortion of input current to the system is less than five percent.

5. An autotransformer system to reduce total harmonic distortion input, the system configured to receive an input of a first voltage and produce an output voltage of a second voltage, wherein the second voltage is less than the first voltage, the system comprising:
   a first three-phase autotransformer coupled to an AC power source, the first autotransformer comprising twenty-one windings having three input terminals and six output terminals with two windings of each phase of the first three-phase autotransformer having turn ratios to effect a decrease in the voltage across said windings over a symmetric voltage value reducing input THD without a zero sequence blocking transformer;
   a first pair of rectifier units coupled to the output terminals of the first three-phase autotransformer, with each rectifier having three input terminals and a plus and a minus output terminal;
   a second three-phase autotransformer coupled to the AC power source, the second autotransformer having three input terminals and six output terminals with the second three-phase autotransformer input terminals coupled to the first three-phase autotransformer input terminals in a reversed phase sequence configuration with two windings of each phase of the second three-phase autotransformer having turn ratios to effect a decrease in the voltage across said windings over a symmetric voltage value reducing input THD without a zero sequence blocking transformer; and
   a second pair of rectifier units coupled to the output terminals of the second three-phase autotransformer, with each rectifier having three input terminals and a plus and a minus output terminal, with each of the plus output terminals of each of the first and second rectifier units are coupled to a first input terminal of an electrical load and each of the minus output terminals of each of the rectifier units to a second input terminal of the electrical load.

6. The autotransformer system of claim 5, wherein the total harmonic distortion of input current to the system is less than five percent.

7. The autotransformer system of claim 5, further comprising an inverter, with the inverter having a plus and a minus input terminal and three output terminals, with inverter coupled to the output of the first and second pairs of rectifiers and the electric load.

8. The autotransformer system of claim 7, wherein the electric load is an AC motor.

9. An autotransformer system to reduce total harmonic distortion input, the system configured to receive an input of a first voltage and produce an output voltage of a second voltage, wherein the second voltage is less than the first voltage, the system comprising:
- a first three-phase autotransformer coupled to an AC power source the first autotransformer comprising twenty-one windings having three input terminals and six output terminals with two windings of each phase of the first three-phase autotransformer having turn ratios to effect a decrease in the voltage across said windings over a symmetric voltage value reducing input THD without a zero sequence blocking transformer;
- a first pair of rectifier units coupled to the output terminals of the first three-phase autotransformer, with each rectifier having three input terminals and a plus and a minus output terminal;
- a second three-phase autotransformer coupled to the AC power source, the second autotransformer having three input terminals and six output terminals with the second three-phase autotransformer input terminals coupled to the first three-phase autotransformer input terminals in a reversed phase sequence configuration with two windings of each phase of the second three-phase autotransformer having turn ratios to effect a decrease in the voltage across said windings over a symmetric voltage value reducing input TIM without a zero sequence blocking transformer; and
- a second pair of rectifier units coupled to the output terminals of the second three-phase autotransformer, with each rectifier having three input terminals and a plus and a minus output terminal, wherein an electrical load is configured as two separate circuits with one of the separate circuits coupled to the plus and minus output terminals of the first pair of rectifier units and the other separate circuit coupled to the plus and minus output terminals of the second pair of rectifier units.

10. A method to reduce total harmonic distortion input in a 24-pulse autotransformer system configured to receive an input of a first voltage and produce an output voltage of a second voltage, wherein the second voltage is greater than the first voltage, the method comprising:
- coupling a first three-phase autotransformer to an AC power source, the first autotransformer comprising twenty-one windings having three input terminals and six output terminals;
- coupling a first pair of rectifier units to the output terminals of the first three-phase autotransformer, each rectifier having three input terminals and a positive and a negative output terminal;
- coupling a second three-phase autotransformer to the AC power source, the second autotransformer comprising twenty-one windings having three input terminals and six output terminals with the second three-phase autotransformer input terminals coupled to the first three-phase autotransformer input terminals in a reversed phase sequence configuration;
- coupling a second pair of rectifier units to the output terminals of the second three-phase autotransformer; and
- coupling each of the positive and negative output terminals of each of the rectifier units to an electrical load.

11. The method of claim 10, wherein the electrical load is configured as two separate circuits with one of the separate circuits coupled to the positive and negative output terminals of the first pair of rectifier units and the other separate circuit coupled to the positive and negative output terminals of the second pair of rectifier units.

12. The method of claim 10, wherein the electrical load comprises an inverter and an AC motor.

13. The method of claim 10, wherein the total harmonic distortion of input current to the system is less than five percent.

14. An autotransformer system to reduce total harmonic distortion input, the system configured to receive an input of a first voltage and produce an output voltage of a second voltage, wherein the second voltage is greater than the first voltage, the system comprising:
- a first three-phase autotransformer coupled to an AC power source, the first autotransformer comprising twenty-one windings having three input terminals and six output terminals;
- a first pair of rectifier units coupled to the output terminals of the first three-phase autotransformer, with each rectifier having three input terminals and a plus and a minus output terminal;
- a second three-phase autotransformer coupled to the AC power source, the second autotransformer comprising twenty-one windings having three input terminals and six output terminals with the second three-phase autotransformer input terminals coupled to the first three-phase autotransformer input terminals in a reversed phase sequence configuration; and
- a second pair of rectifier units coupled to the output terminals of the second three-phase autotransformer, with each rectifier having three input terminals and a plus and a minus output terminal, with each of the plus output terminals of each of the first and second rectifier units are coupled to a first input terminal of an electrical load and each of the minus output terminals of each of the rectifier units to a second input terminal of the electrical load.

15. The autotransformer system of claim 14, wherein the total harmonic distortion of input current to the system is less than five percent.

16. The autotransformer system of claim 14, further comprising an inverter, with the inverter having a plus and a minus input terminal and three output terminals, with inverter coupled to the output of the first and second pairs of rectifiers and the electric load.

17. The autotransformer system of claim 16, wherein the electric load is an AC motor.

18. An autotransformer system to reduce total harmonic distortion input, the system configured to receive an input of a first voltage and produce an output voltage of a second voltage, wherein the second voltage is greater than the first voltage, the system comprising:
- a first three-phase autotransformer coupled to an AC power source, the first autotransformer comprising twenty-one windings having three input terminals and six output terminals;
- a first pair of rectifier units coupled to the output terminals of the first three-phase autotransformer. with each rectifier having three input terminals and a plus and a minus output terminal;
- a second three-phase autotransformer coupled to the AC power source. the second autotransformer comprising twenty-one windings having three input terminals and six output terminals with the second three-phase autotransformer input terminals coupled to the first three-phase autotransformer input terminals in a reversed phase sequence configuration; and
- a second pair of rectifier units coupled to the output terminals of the second three-phase autotransformer, with each rectifier having three input terminals and a plus and a minus output terminal, wherein an electrical load is configured as two separate circuits with one of the separate circuits coupled to the plus and minus output terminals of the first pair of rectifier units and the other separate circuit coupled to the plus and minus output terminals of the second pair of rectifier units.

* * * * *